(12) United States Patent
Sakaue et al.

(10) Patent No.: US 9,391,486 B2
(45) Date of Patent: Jul. 12, 2016

(54) ELECTRIC POWER STEERING ELECTRIC MOTOR APPARATUS AND ELECTRIC POWER STEERING APPARATUS

(75) Inventors: Atsushi Sakaue, Tokyo (JP); Yoshihito Asao, Tokyo (JP); Satoru Akutsu, Tokyo (JP); Isao Sonoda, Tokyo (JP); Kazuhisa Takashima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 110 days.

(21) Appl. No.: 13/883,944

(22) PCT Filed: May 30, 2011

(86) PCT No.: PCT/JP2011/062335
§ 371 (c)(1),
(2), (4) Date: May 7, 2013

(87) PCT Pub. No.: WO2012/098703
PCT Pub. Date: Jul. 26, 2012

(65) Prior Publication Data
US 2013/0221776 A1 Aug. 29, 2013

(30) Foreign Application Priority Data
Jan. 18, 2011 (JP) .................................. 2011-007934

(51) Int. Cl.
H02K 11/00 (2006.01)
H02K 5/22 (2006.01)
B62D 5/04 (2006.01)

(52) U.S. Cl.
CPC .............. *H02K 5/225* (2013.01); *B62D 5/0406* (2013.01); *H02K 11/33* (2016.01)

(58) Field of Classification Search
CPC ........................... H02K 5/225; H02K 11/0073

USPC .............................................................. 310/71
See application file for complete search history.

(56) References Cited

U.S. PATENT DOCUMENTS 5,945,766 A * 8/1999 Kim et al. ...................... 310/268
6,329,735 B1 * 12/2001 Tanaka et al. ................. 310/239
(Continued)

FOREIGN PATENT DOCUMENTS

| CN | 101557140 A | 10/2009 |
|---|---|---|
| JP | 2008125309 A | 5/2008 |
| JP | 2009-248754 A | 10/2009 |

OTHER PUBLICATIONS

Communication dated Feb. 28, 2015, issued by the State Intellectual Property Office of the People's Republic of China in counterpart Application No. 201180064370.6.

*Primary Examiner* — Hanh Nguyen
(74) *Attorney, Agent, or Firm* — Sughrue Mion, PLLC

(57) ABSTRACT

An electric power steering electric motor apparatus includes: an electric motor including: a motor housing; a stator; a rotor; and a power supplying portion that supplies electric power to the stator; and a controlling unit including: a driving circuit that supplies electric power to the electric motor; a connecting portion; a controlling circuit; and a case that covers the driving circuit and the controlling circuit, the electric motor and the controlling unit being mounted coaxially onto a gear housing that reduces rotational speed of the electric motor so as to position the controlling unit on a side near the gear housing, and the connecting portion being connected to the power supplying portion inside the case through an opening portion formed on the case, and being positioned and held by an insulating member so as to be insulated from the case and the motor housing.

10 Claims, 5 Drawing Sheets

(56) References Cited

U.S. PATENT DOCUMENTS

| | | | |
|---|---|---|---|
| 2006/0063418 A1* | 3/2006 | Motzigkeit | 439/425 |
| 2008/0219867 A1* | 9/2008 | Sakata | 417/410.1 |
| 2009/0250287 A1* | 10/2009 | Takashima et al. | 180/444 |

* cited by examiner

ELECTRIC POWER STEERING ELECTRIC MOTOR APPARATUS AND ELECTRIC POWER STEERING APPARATUS

CROSS REFERENCE TO RELATED APPLICATIONS

This application is a National Stage of International Application No. PCT/JP2011/062335 filed May 30, 2011, claiming priority based on Japanese Patent Application No. 2011-007934 filed Jan. 18, 2011, the contents of all of which are incorporated herein by reference in their entirety.

TECHNICAL FIELD

The present invention relates to an electric power steering electric motor apparatus in which an electric motor portion and a controlling unit therefor are disposed on a rotating shaft and to an electric power steering apparatus that uses the same, and particularly relates to a construction of an electrical connection portion that transmits electric power that is required for driving the electric motor portion from the controlling unit to the electric motor portion.

BACKGROUND ART

In conventional electric power steering electric motor apparatuses, an electric motor and a controlling unit are formed integrally, and are disposed so as to be coaxial to a shaft that extends from a gearbox that reduces rotational speed of the electric motor, the controlling unit being disposed between the gearbox and the electric motor, and a power supplying part of the electric motor and a connecting part of the controlling unit are connected to each other inside the housing or inside the case through an opening part that is disposed on the housing or the case or both.

In the above configuration, the connecting part, which extends out from the controlling unit, and the power supplying part, which extends out from the electric motor, are overlapped and joined by a screw (see Patent Literature 1, for example).

CITATION LIST

Patent Literature

Patent Literature 1: Japanese Patent Laid-Open No. 2009-248754 (Gazette: FIG. 2)

SUMMARY OF THE INVENTION

Problem to be Solved by the Invention

In the electric power steering electric motor apparatus according to Patent Literature 1 above, a driving circuit is disposed near the housing in order to improve the heat radiating characteristics of the driving circuit. Since opening and closing of this driving circuit is controlled by a controlling circuit to supply electric driving power to the electric motor, it is necessary for the controlling circuit and the power supplying part of the electric motor to be electrically connected to each other.

Since automotive power supply voltages are low, it is necessary for electric power steering electric motor apparatuses to pass large currents in order to generate large outputs. Transistors in the controlling circuit therefore generate large amounts of heat. Consequently, it is necessary for the controlling circuit of the electric power steering electric motor apparatus to be mounted near the housing in order to radiate these amounts of heat.

In constructions such as that described above, fastening and dismantling are facilitated by screws, but because the spacing between the controlling circuit and the power supplying portion of the electric motor is wider, connecting terminals that project outward from the controlling circuit toward the electric motor are longer, and one problem has been that connecting positions with the power supplying part of the electric motor vary, making assembly difficult.

The present invention aims to solve the above problems and an object of the present invention is to provide an electric power steering electric motor apparatus and an electric power steering apparatus that uses the same that can stabilize a position of a connecting terminal without losing ease of assembly of the electric motor and the controlling unit.

Means for Solving the Problem

In order to achieve the above object, according to one aspect of the present invention, there is provided an electric power steering electric motor apparatus including: an electric motor including: a stator; and a rotor that is disposed inside the stator; and a controlling unit including: a driving circuit that is connected to the stator to supply electric power; a controlling circuit that controls the driving circuit; and a housing that covers the driving circuit and the controlling circuit, and to which the electric motor can be mounted, wherein: the electric motor and the controlling unit are configured approximately coaxially; the electric power steering electric motor apparatus includes: a power supplying portion that projects outward from the electric motor; and a connecting portion that projects outward from the controlling unit, and that is connected to the power supplying portion; and the connecting portion is held on the housing by means of an insulating member.

Effects of the Invention

According to the present invention, assembly of an electric motor and a controlling unit can be improved by disposing an insulating member on a case of a controlling unit, and performing positioning of a connecting terminal using this insulating member.

DESCRIPTION OF EMBODIMENTS

Embodiment 1

Next, Embodiment 1 of the present invention will be explained based on FIGS. 1 through 10. In the descriptions of the drawings below, identical or similar numbering is used on portions that are identical or similar. However, the drawings are schematic, and ratios between respective dimensions may be different than actual configurations. Consequently, specific dimensions, etc., should be determined upon consideration of the explanations below, and there may also be cases in which mutual dimensional relationships or ratios differ from actual cases even between each of the drawings.

Figure 1:
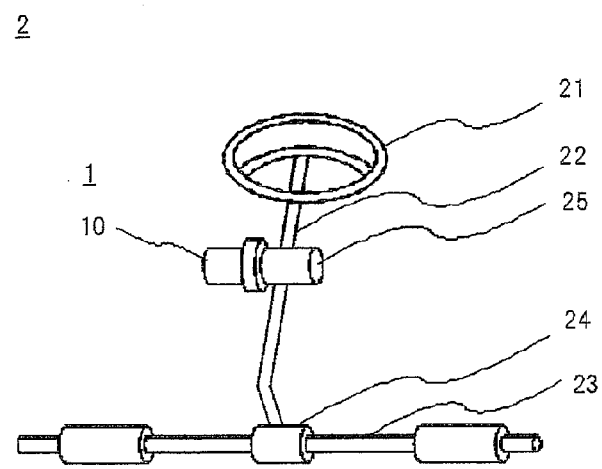
FIG. 1 is a conceptual diagram that shows an overview of an electric power steering system according to Embodiment 1 of the present invention.

FIG. 1 is a conceptual diagram that shows an overview of an electric power steering system according to Embodiment 1 of the present invention. In the figure, in a electric power steering system 2, steering force from vehicle steering (a steering wheel) 21 is transmitted through a column shaft 22 to a steering gear box 24.

An electric power steering electric motor apparatus 1 is mounted onto the column shaft 22 by means of a gear housing 25 that is disposed in order to house a speed reducing mechanism, etc. Output to the column shaft 22 from the electric motor portion 10 of the electric power steering electric motor apparatus 1 is reduced by the speed reducing mechanism, and is transmitted such that a direction of rotation is changed by 90 degrees.

A pinion gear is disposed on a portion of the steering gear box 24 that is connected to the column shaft 22, and is housed inside the steering gear box 24. This pinion gear transmits rotational motion to a rack bar 23 as rectilinear motion. The rack bar 23 obtains a predetermined displacement in response thereto. The vehicle wheels operate interdependently with a displacement that is based on this rectilinear motion of the rack bar 23 to enable changes in direction, etc., of the vehicle.

Figure 2:
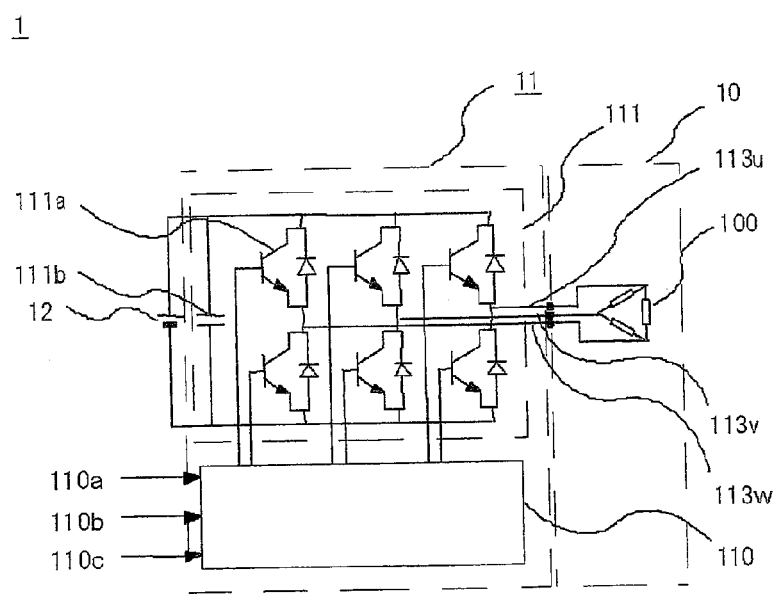
FIG. 2 is a schematic diagram of an electrical circuit portion of an electric power steering electric motor apparatus according to Embodiment 1 of the present invention.

FIG. 2 is a schematic diagram of an electric power steering electric motor apparatus according to Embodiment 1 of the present invention. In the figure, the electric power steering electric motor apparatus 1 is constituted by: an electric motor portion 10 that has an electric motor that converts an electric current to magnetic force to generate a driving force; and a controlling unit 11 that controls the driving force from the electric motor portion 10 by supplying predetermined electric power to the electric motor portion 10.

Respective signals that relate to vehicle speed 110a, steering angle 110b, and torque 110c that are based on commands from external portions are input into a controlling circuit 110, and the controlling unit 11 controls the driving circuit 111 by output from this controlling circuit 110. A predetermined steering torque is thereby assisted by controlling the electric power that is supplied to the electric motor portion 10.

The driving circuit 111 is constituted by a switching circuit that is primarily constituted by a plurality of transistors 111a; and a capacitor 111b for noise reduction and suppressing ripple components in a power supply voltage, and is connected to a motor driving electric power supply 12 that is disposed externally or internally. The driving circuit 111 controls the plurality of transistors 111a from the controlling circuit 110 using pulse-width modulation (PWM) to control the driving force of the motor 100 by ON/OFF operation thereof.

Figure 3:
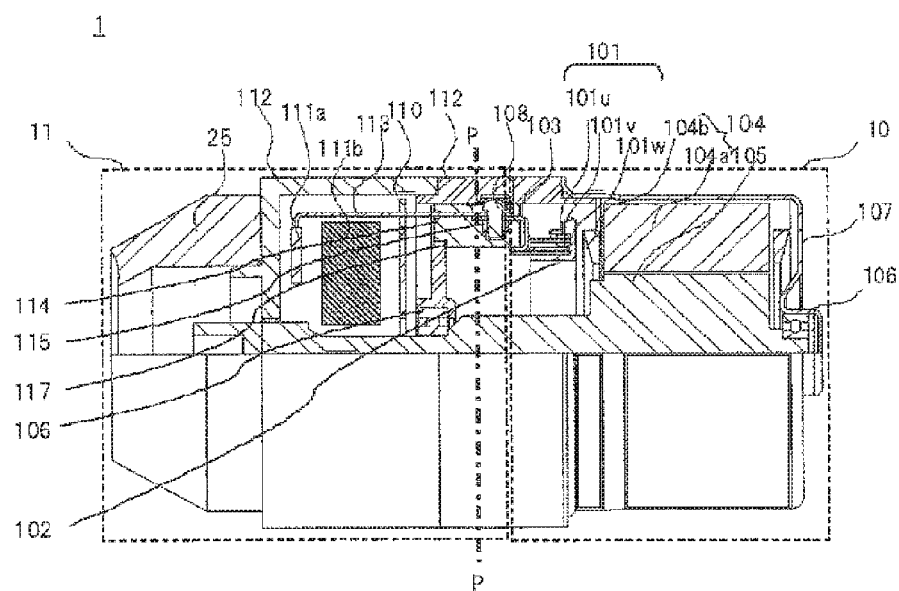
FIG. 3 is a partial cross section of an electric power steering apparatus according to Embodiment 1 of the present invention.

FIG. 3 is a partial cross section of an electric power steering apparatus according to Embodiment 1 of the present invention. The electric motor portion 10 is housed inside a motor housing 107, and includes a stator 104 that is made by winding stator windings 104b that are conductors into a stator core 104a that is made of laminated electromagnetic steel sheets. The stator windings 104b are connected to busbars 101 to configure a circuit that has a delta connection. Moreover, if there is a star connection, the circuit is configured by connecting common sides of the respective stator windings 104b to the common terminal. A rotor 105 is held inside the stator 104 by means of bearings 106.

The busbars 101, which extend circumferentially for power supply to and connection of respective phases, are housed in a holder 102. In the example in FIG. 3, the respective busbars 101u, 101v, and 101w are housed as a U phase, a V phase, and a W phase from an outer circumferential side. Moreover, if a star connection is used, four phases of busbars 101 that further include a common terminal are housed therein.

Power supplying portions 103 are connected to the respective busbars 101, and electric power is supplied from the controlling unit 11. The power supplying portions 103 project outward toward the controlling unit 11 from the electric motor portion 10, and are fastened at coupling portions thereof by screws 108 to connecting terminals 113, which are connecting portions that are connected to the electric motor portion 10. In FIG. 3, a W-phase example is shown, being representative thereof.

The connecting terminals 113 and the power supplying portions 103 in the present embodiment are both constituted by flat plates. Resistance in the coupling portions can be reduced by applying tin plating, etc., to at least one of these. The connecting terminals 113 and the power supplying portions 103 do not particularly need to be configured so as to be flat provided that they have constructions that can be coupled. For example, they may have primarily cylindrical constructions, primarily hexagonal prism constructions, primarily octagonal prism constructions, etc., and are not limited to a particular construction.

Here, the connecting terminals 113 that project outward from the controlling unit 11 are long, and are held by a case 112 that is a housing of the controlling unit 11 that is disposed for the purpose of mounting the electric motor portion 10, and for holding the controlling circuit 110 and the driving circuit 111. In order to maintain overall rigidity of the electric power steering electric motor apparatus, the case 112 that is normally made of metal. Because of that, it is necessary to maintain insulation from the connecting terminals 113.

This insulation can be achieved using an insulating member 114 that also serves as positioning for the connecting terminals 113. As explained above, because the connecting terminals 113 are long, irregularities in the mounted positions thereof are increased. Because of that, there may be difficulties when inserting and mounting the power supplying portions 103. Here, positioning of the connecting terminals 113 is enabled by holding the connecting terminals 113 on the case 112 by means of the insulating member 114, solving the above problem.

Now, predetermined performance is required of the insulating member 114 with respect to flame retardancy, heat resistance, and insulation. This performance is a performance that follows design conditions of the electric power steering apparatus. Polyphenylene sulfide (PPS), a nylon resin, bakelite, or a liquid crystal polymer (LCP) is conceivable as the material, but is not limited thereto provided that the above predetermined performance is met.

Figure 10:
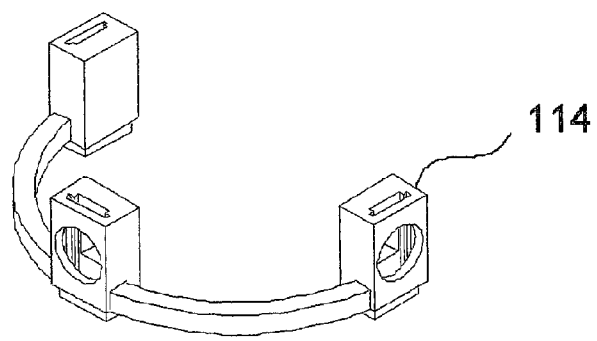
FIG. 10 is a perspective that shows an example of the insulating member according to Embodiment 1 of the present invention.

FIG. 10 is a perspective that shows an example of the insulating member according to Embodiment 1 of the present invention. In this case, an example in which the insulating member 114 for the respective phases is configured as a single body has been given, but it may also be divided into respective phases as described below.

The configuration that is shown here is only an example of the present embodiment, but it is clear that it is not limited to this configuration provided that it is a configuration that can achieve the effects of the present invention.

Nuts 115 are held in the insulating members 114, enabling fastening to be performed simply by fastening using the screws 108 from an outer circumferential side. In the present embodiment, an example is shown in which the nuts 115 are disposed in the insulating member 114 in advance, but the configuration may also be such that female threads are cut into the insulating member 114 in advance. In that case, not only are nuts 115 naturally no longer required, but operations to fix the nuts 115 in predetermined positions can also be omitted.

Similar or identical effects can also be achieved by making the connecting terminals 113 and the power supplying portions 103 plug connections instead of screw fastenings. In that case, positioning of the connecting terminals 113 is made possible by the connecting terminals 113 being held by the case 112 by means of the insulating member 114, enabling the power supplying portions 103 to be mounted easily, and also having an effect of preventing dislodging.

Since fastening using the screws 108 is performed after the electric motor portion 10 and the controlling unit 11 are coupled, a construction in which the screws 108 can be fastened from an outer circumferential side is required.

When coupling the electric motor portion 10 and the controlling unit 11, if the connecting terminals and the power supplying portions project outward toward each other as in conventional techniques, then interference may occur, making coupling difficult. However, in the present embodiment, this is less likely to occur. By making the construction such that a predetermined space is ensured around a periphery of the connecting terminals 113 after insertion into the insulating member 114, connections can be made stably even if there is some variation in position in the power supplying portions 103 of the electric motor portion 10 when the power supplying portions 103 are inserted after insertion of the connecting terminals 113, making interference even less likely to occur and make coupling difficult.

Figure 4:
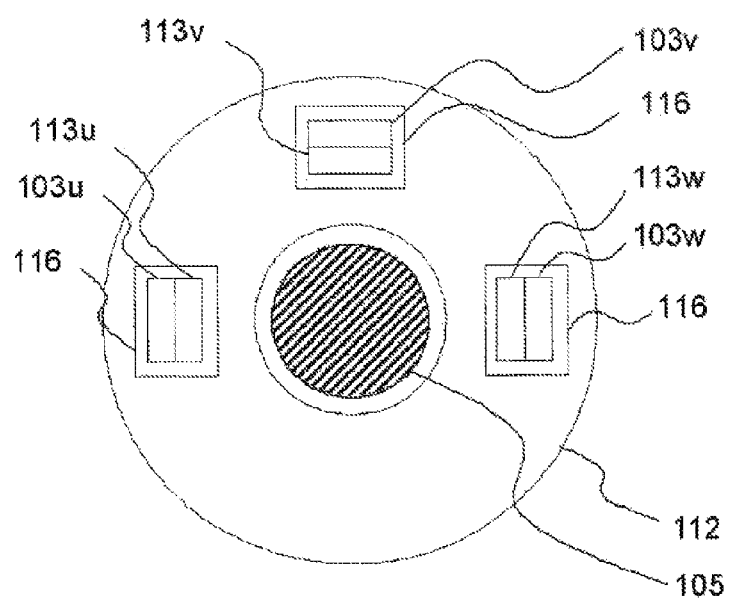
FIG. 4 is a cross section of the electric power steering electric motor apparatus according to Embodiment 1 of the present invention in a plane that is perpendicular to a rotating shaft.

FIG. 4 is a cross section of the electric power steering electric motor apparatus according to Embodiment 1 of the present invention in a plane that is perpendicular to a rotating shaft. As shown in FIG. 4, the respective coupling portions of the connecting terminals 113$u$, 113$v$, and 113$w$ and the power supplying portions 103$u$, 103$v$, and 103$w$ of the U phase, the V phase, and the W phase, respectively, are disposed so as to maintain a predetermined spacing.

Irregularities in the power supplying portions 103 of the electric motor portion 10 arise easily when being connected to the busbars 101. Because the connecting terminals 113 of the respective phases are divided, irregularities are more likely to arise at positions of the coupling portions of the respective phases. By disposing the power supplying portions 103$u$, 103$v$, and 103$w$ so as to maintain a predetermined spacing between the respective coupling portions thereof, as in the present embodiment, stresses that are applied to the insulating member 114 can be reduced.

In other words, errors when mounting an electric current supplying member onto the busbars do not depend on the electric current supplying member, and can be expected to have an approximately constant value. During subsequent assembly, the electric motor portion and the controlling unit are inserted into the insulating member. At this point, the insulating member is subjected to stresses from the electric current supplying member, but because the ratio of distortion is reduced as original length increases, stresses are reduced proportionately. Similar or identical effects can also be achieved even if the insulating member 114 is divided into respective phases or a plurality of parts.

Figure 5:
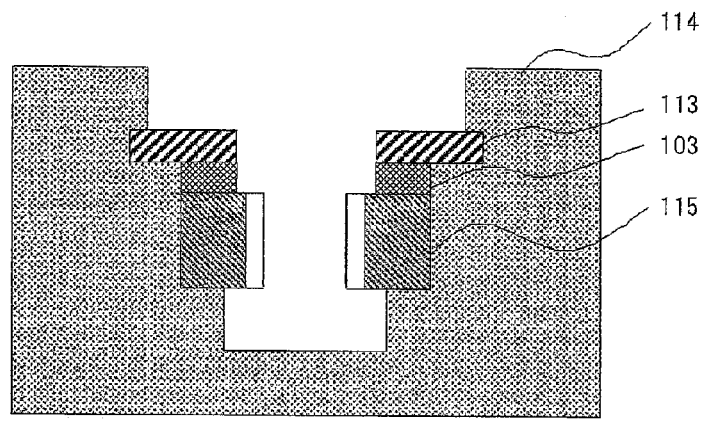
FIG. 5 is a cross section that shows a coupling portion according to Embodiment 1 of the present invention in a plane that is perpendicular to a rotating shaft.

FIG. 5 is a cross section that shows a coupling portion according to Embodiment 1 of the present invention, specifically a state before insertion of a screw into a screw insertion portion. As shown in FIG. 5, the connecting terminals 113 can be positioned stably by increasing a plate width of the connecting terminals 113 compared to a plate width of the power supplying portions 103.

Figure 6:
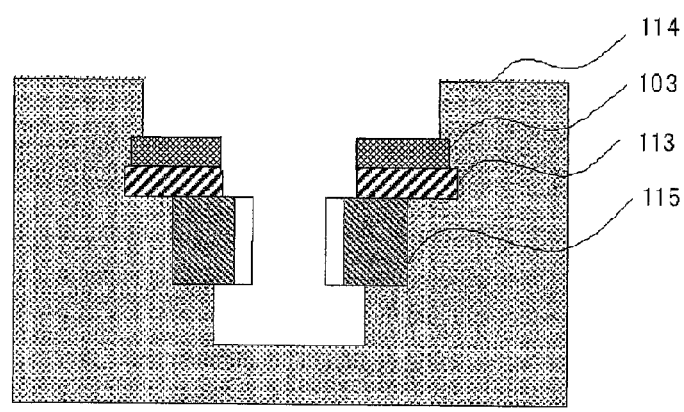
FIG. 6 shows a variation of FIG. 5 according to Embodiment 1 of the present invention.

FIG. 6 shows a variation of FIG. 5 according to Embodiment 1 of the present invention. As shown in FIG. 6, similar or identical effects can also be achieved in a configuration in which the connecting terminals 113 are disposed radially inside the power supplying portions 103 (bottom of figure) by increasing the plate width of the connecting terminals 113 compared to that of the power supplying portions 103.

The power supplying portions 103 of the electric motor portion 10 are mounted onto the holder 102 as separate members after the busbars 101 are mounted onto the stator windings 104$b$. When the busbars 101 are connected to the stator windings 104$b$, it is difficult to fix the positions thereof in readiness, and when the busbars 101 and the power supplying portions 103 are constituted by integrated parts it is more difficult to hold the positions thereof in readiness than when the busbars 101 and the power supplying portions 103 are constituted by separate members.

Figure 7:
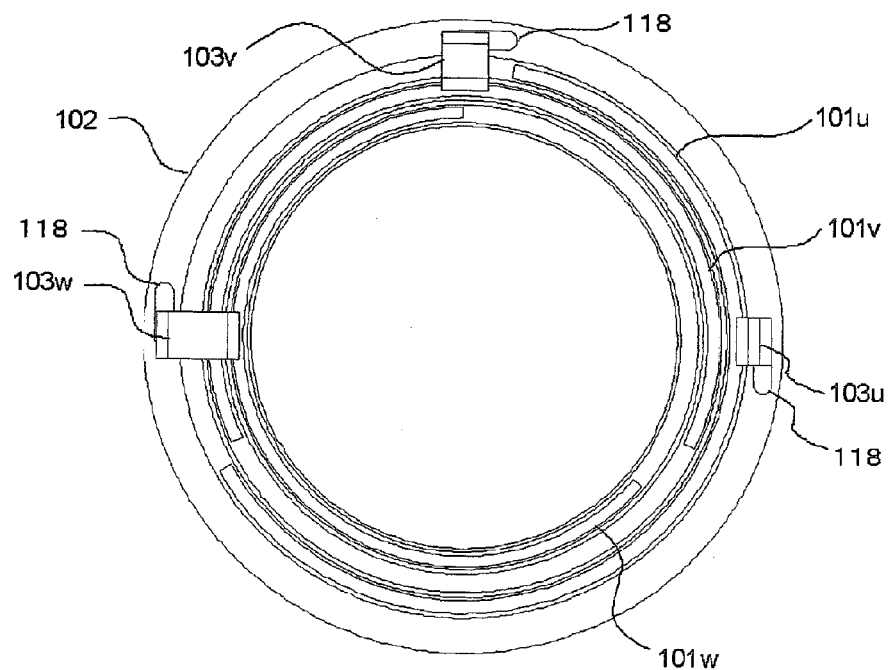
FIG. 7 is a cross section of the electric power steering electric motor apparatus according to Embodiment 1 of the present invention in a plane that is perpendicular to a rotating shaft when positioning apertures are disposed thereon.

Consequently, by disposing the positioning apertures 118 on the holder 102, as shown in FIG. 7, a configuration can be made in which the power supplying portions 103 are easily positioned.

Figure 8:
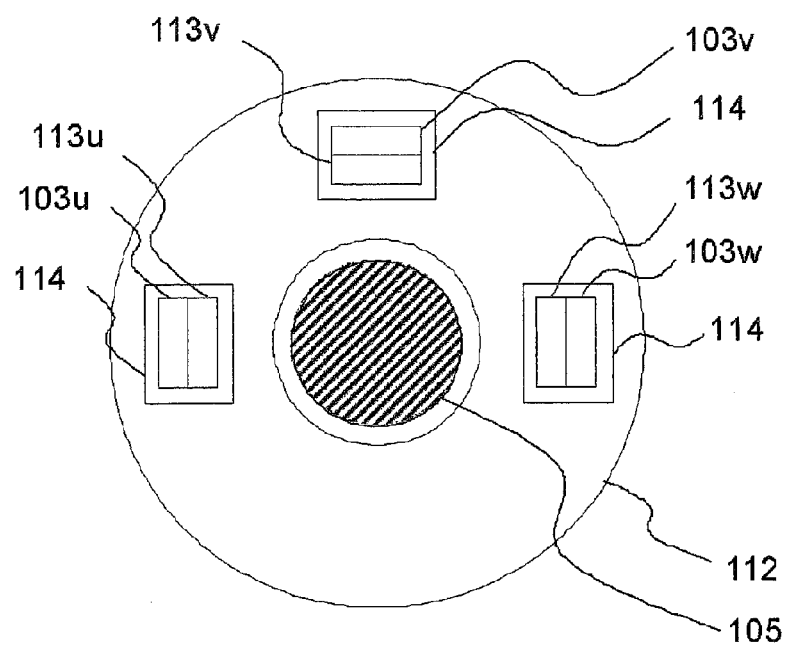
FIG. 8 is a cross section that shows a case in which an insulating member according to Embodiment 1 of the present invention is divided into respective phases.

As described above, the insulating member 114 can be divided into respective phases or a plurality of parts. FIG. 8 is a cross section on plane P-P in FIG. 3 that shows a case in which the insulating member 114 is divided into respective phases.

By dividing them into separate phases, the strain to which each of the insulating members is subjected can be reduced. This is because the insulating member in any given phase is not subjected to influences such as the power supplying portions in other phases as strain.

Figure 9:
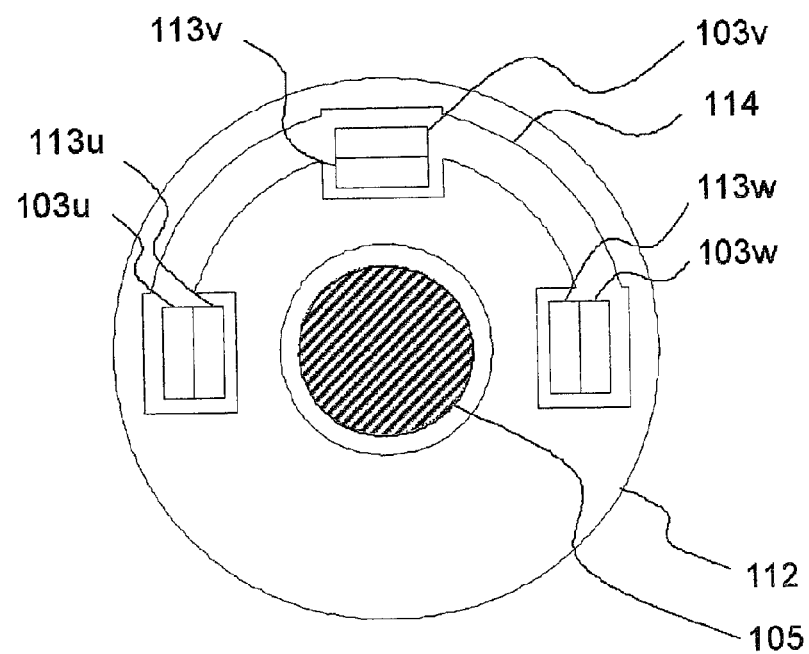
FIG. 9 is a cross section that shows a case in which the insulating member according to Embodiment 1 of the present invention is formed as a single body.

Two or more phases of an insulating member 114 that is divided into respective phases may also be linked. The linking method may also link all of the phases in the insulating member 114, or a configuration may also be adopted in which at least two phases of the insulating member 114 are linked. FIG. 9 is a cross section on plane P-P in FIG. 3 that shows a case in which the insulating member 114 is formed as a single body. As shown in FIG. 9, the insulating members 114 of respective phases may also be configured as a single body. In that case, a configuration may also be adopted in which at least two phases of the insulating member 114 are integrated.

By adopting a configuration of this kind, since the relative precision of the apertures into which the power supplying portions are inserted is ensured on a single part, one effect is to improve assembly when assembling the controlling unit 11 and the electric motor portion 10 because the relative positioning of the current supplying terminals, which are insertion points, can be fixed by the insulating member 114.

A positioning surface 117, which is a surface that contacts a surface of the case 112 of the controlling unit 11 on a side near the electric motor portion 10 is disposed on the insulating member 114 in order to perform axial positioning of the insulating member 114. In FIG. 3, positioning can be performed by placing the positioning surface 117 of the insulating member 114 in contact with the facing surface of the case 112, and foreign matter such as dust from outside is also prevented from entering through the opening portion 116 of the case 112 of the controlling unit 11, enabling dustproofing performance of the electric power steering electric motor apparatus 1 to be increased.

Moreover, the present invention is not limited to the content of the embodiment that is explained above, and a variety of modifications are possible within the scope of the claims. For example, the above embodiment has been explained using a case in which the present invention is applied to a "column-assist" electric power steering apparatus as an example, as shown in FIG. 1, but is not limited thereto, and it goes without saying that the present invention can also easily be adapted to "pinion-assist" and "rack-assist" electric power steering apparatuses by "any person skilled in the art".

In the above embodiment, an example in which the present invention is applied to an electric power steering apparatus that outputs output from an electric motor as an auxiliary steering force has been explained, but is not particularly limited to electric power steering apparatuses provided that an electric motor that has a configuration that is shown in the above embodiment is used.

EXPLANATION OF NUMBERING

1 ELECTRIC POWER STEERING ELECTRIC MOTOR APPARATUS; 10 ELECTRIC MOTOR PORTION; 101 BUSBARS; 101u U-PHASE BUSBAR; 101v V-PHASE BUSBAR; 101w W-PHASE BUSBAR; 102 HOLDER; 103 POWER SUPPLYING PORTIONS; 103u U-PHASE POWER SUPPLYING PORTION; 103v V-PHASE POWER SUPPLYING PORTION; 103w W-PHASE POWER SUPPLYING PORTION; 104 STATOR; 104a STATOR CORE; 104b STATOR WINDING; 105 ROTOR; 106 BEARING; 107 MOTOR HOUSING; 108 SCREW; 11 CONTROLLING UNIT; 110 CONTROLLING CIRCUIT; 110a VEHICLE SPEED CONTROLLING SIGNAL; 110b STEERING ANGLE CONTROLLING SIGNAL; 110c TORQUE CONTROLLING SIGNAL; 111 DRIVING CIRCUIT; 111a TRANSISTOR; 111b CAPACITOR; 112 CASE; 113 CONNECTING TERMINALS; 113u U-PHASE CONNECTING TERMINAL; 113v V-PHASE CONNECTING TERMINAL; 113w W-PHASE CONNECTING TERMINAL; 114 INSULATING MEMBER; 115 NUT; 116 OPENING PORTION; 117 POSITIONING SURFACE; 118 POSITIONING APERTURE; 12 MOTOR DRIVING ELECTRIC POWER SUPPLY; 2 ELECTRIC POWER STEERING SYSTEM; 21 STEERING; 22 COLUMN SHAFT; 23 RACK BAR; 24 STEERING GEAR BOX; 25 GEAR HOUSING.

The invention claimed is:

1. An electric power steering electric motor apparatus comprising:
    an electric motor comprising:
        a motor housing;
        a stator that is held by said motor housing;
        a rotor that is disposed inside said stator so as to be rotatably supported by said motor housing; and
        a power supplying portion that is connected to said stator to supply electric power; and
    a controlling unit comprising:
        a driving circuit that supplies electric power to said electric motor;
        a connecting portion that is connected to said power supplying portion;
        a controlling circuit that controls said driving circuit; and
        a case that covers said driving circuit and said controlling circuit,
    said electric motor and said controlling unit being mounted coaxially onto a gear housing that reduces rotational speed of said electric motor so as to position said controlling unit on a side near said gear housing,
    wherein said connecting portion is connected to said power supplying portion inside said case through an opening portion that is formed on said case, and is positioned and held by an insulating member disposed inside said case so as to be insulated from said case and said motor housing, and
    wherein said power supplying portion contacts said connecting portion along a first direction, and said power supplying portion and said connecting portion contact said insulating member along respective portions of said insulating member, said respective portions being perpendicular to said first direction and provided in different planes from each other.

2. The electric power steering electric motor apparatus according to claim 1, wherein said connecting portion and said power supplying portion are fastened by a screw from a radial direction.

3. The electric power steering electric motor apparatus according to claim 2, wherein a nut is held by said insulating member.

4. The electric power steering electric motor apparatus according to claim 1, wherein said connecting portion and said power supplying portion are constituted by flat plates that face each other and partially overlap.

5. The electric power steering electric motor apparatus according to claim 4, wherein a plate width of said connecting portion is larger than a plate width of said power supplying portion.

6. The electric power steering electric motor apparatus according to claim 1, wherein coupling portions between said connecting portion and said power supplying portion are disposed so as to leave a predetermined spacing with respect to a direction of rotation.

7. The electric power steering electric motor apparatus according to claim 1, wherein said insulating member is disposed so as to be divided into respective phases of said electric motor.

8. The electric power steering electric motor apparatus according to claim 1, wherein said insulating member is disposed so as to be divided into a plurality of phases of said electric motor.

9. The electric power steering electric motor apparatus according to claim 1, wherein said insulating member comprises a surface that contacts a surface of said case of said controlling unit near said electric motor.

10. The electric power steering apparatus characterized in comprising an electric power steering electric motor apparatus according to claim 1.

* * * * *